Feb. 2, 1954 — S. C. PETERSEN — 2,667,867
FACE CREAM APPLYING AND FACE MASSAGING IMPLEMENT
Filed Dec. 11, 1951

Soren C. Petersen
INVENTOR.

Patented Feb. 2, 1954

2,667,867

UNITED STATES PATENT OFFICE 2,667,867

FACE CREAM APPLYING AND FACE MASSAGING IMPLEMENT

Soren C. Petersen, Chicago, Ill.

Application December 11, 1951, Serial No. 261,077

5 Claims. (Cl. 128—62)

My invention relates to improvements in face cream applying and face massaging implements of the fountain type.

The primary object of my invention is to provide an implement easily manipulated by one hand to apply face cream to the face with a rolling and subsequent rubbing action, or, with a rolling or rubbing action selectively, and which is adapted for finger tip operation to renew, when occasion may require, the supply of face cream to be applied while the implement is held in the hand.

Another object is to provide an implement for the above purposes which is easy to maintain clean particularly as regards the cream applying parts and which is simply constructed and comparatively inexpensive to manufacture and use.

Other and subordinate objects, within the purview of my invention, together with the precise nature of my improvements will be readily understood when the succeeding description and claims are read with reference to the drawing, accompanying and forming part of this specification.

Figure 1:
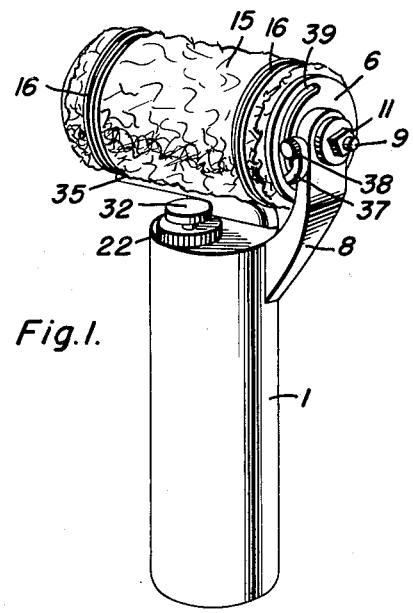
Figure 1 is a view in perspective of my improved implement in the preferred embodiment thereof.
Figure 2:
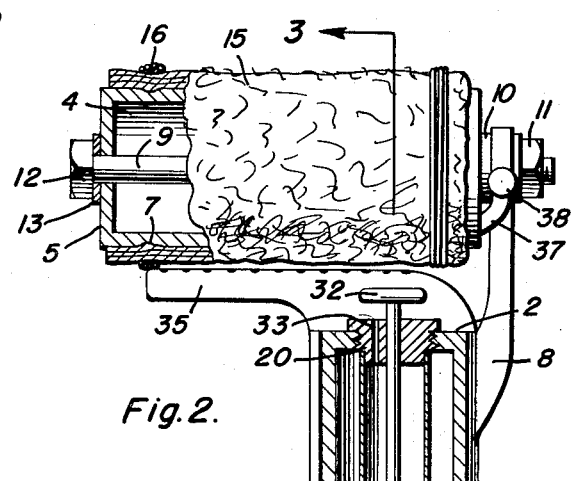
Figure 2 is an enlarged view partly broken away and shown in front elevation and section.
Figure 3:
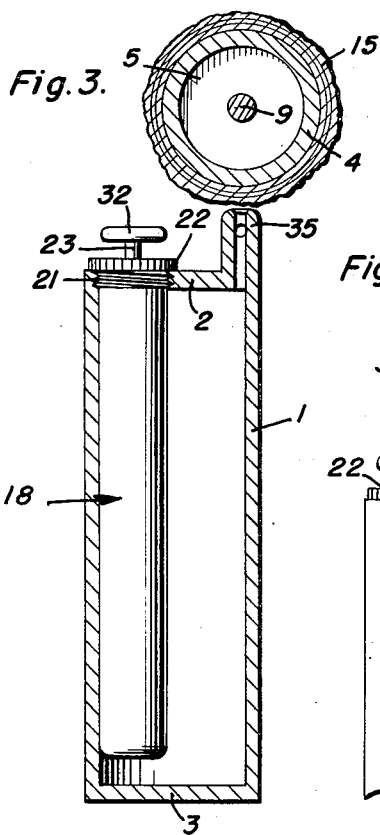
Figure 3 is a view in longitudinal section taken on the line 3—3 of Figure 2.
Figure 4:
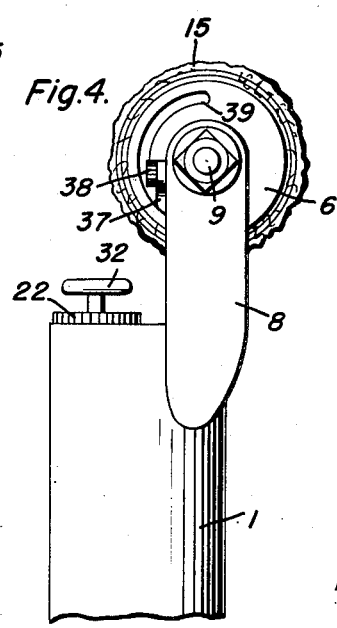
Figure 4 is a fragmentary view in side elevation.

Referring to the drawing by numerals, my improved implement comprises a hollow, preferably cylindrical, handle 1 having front and rear closed ends 2, 3, respectively, and adapted to contain a suitable amount of face cream, not shown.

An applicator roller 4 is mounted, by means presently described, at the front end 2 of the handle 1 to extend across said end in spaced relation thereto and in off-set relation to the axis of the handle 1 so as to dispose said roller at what constitutes the rear side of the handle, for a purpose presently clear. The applicator roller 4 is preferably hollow for lightness in weight and provided with closed ends 5, 6 and circumferential grooves therein adjacent said ends 5 and 6 serving a purpose presently clear and one of which is shown at 7.

The means for mounting the applicator roller 4 comprises a rigid bracket arm 8 on one side of the handle 1 at the front end thereof extending forwardly of said handle, a rod 9 extending through the bracket arm 8 transversely of the handle 1 and axially through the applicator roller 4 and the ends 5, 6, of said roller 4, which are journaled on said rod for free easy rotation of said roller. The rod 9 is clamped at one end in the bracket arm 8 by a collar 10 on said rod and a nut 11 on said end of the rod. A head 12 and washer 13 on the other end of the rod 9 removably secure the applicator roller 4 on said rod against the collar 10.

A tubular cover 15 of absorbent material, preferably fabric, is provided on the applicator roller 4 and removably secured thereon by wrapping threads 16 around said cover opposite the grooves 7 to compress the cover 15 in said grooves.

Means is provided for injecting cream from the handle 1 against the cover 15 comprising the following. A plunger type air pump 18 is suspended in the handle 1 from the front end 2 thereof, and is off-set to the side of the axis of the handle 1 opposite that at which the applicator roller 4 is off-set for operation in a manner presently described by the finger of the hand grasping the handle 1 and without interference with such operation by the applicator roller 4.

The pump 18 comprises a cylinder 19 which extends longitudinally in the handle and is spaced at its rear end from the rear end 3 of said handle with a threaded front end closure plug 20 turned into a threaded filler opening 21 in the front end 2 of the handle 1 and provided with an end flange 22 for closing said opening air tight and which is knurled for screwing the plug 20 into and out of the opening 21 to remove and attach the pump 18.

The cylinder 19 is provided with a conventional piston equipped plunger rod 23 therein which is slidable in the plug 20 to advance the same from a retracted position and thereby cause the piston 24 to expel air out of an air discharge opening 25 in the rear end of the cylinder 19 so as to compress air in the handle 1. The piston 24 is of the conventional, flexible cup, bicycle pump type, contracting and expanding during retraction and advance, respectively, to pass air from behind the same forwardly thereof for compression when the piston advances, and creating a partial vacuum in front thereof when the piston is retracted. A coil spring 26 is interposed between the piston 24 and an apertured disk 27 fixed in the rear end of the cylinder 19 and functions to retract said rod 23 and piston 24 into a normal position. The disk 27 forms with the rear end of the cylinder 19 a valve cage 28 for a ball check valve member 29 closing the aperture 30 in the disk 27 under suction created in the cage 28 by retraction of the piston 24. A finger button 32 is provided on the plunger rod 23 at the front end of the handle 1 for advancing said rod by finger pressure. A back pressure air vent 33 is provided in the plug 20 for obvious reasons. An elongated perforated nozzle 35 extends across the front end 2 of the handle 1 between the same and the roller 4, longitudinally of said roller, and communicates with the interior of the handle 1 to eject face cream from the handle 1 onto the cover 15.

Co-engaging, disengageable, stop devices are provided on the roller 4 and bracket arm 8, respectively, for limiting rotation of the applicator roller 4 or freeing the same and comprising the following. A dog 37 is pivoted by a clamping screw 38 on the bracket arm 8 opposite the end 6 of the applicator roller 4 to be swung and clamped in roller dogging and releasing positions, respectively. An arcuate slot 39 is provided in the end 6 of the applicator roller 4 into which the dog 37 may be entered slidably when swung into dogging position to limit rotation of said roller 4 by engagement with the ends of said slot. In its releasing position, the dog 37 is withdrawn from the slot 39 to permit free rotation of the applicator roller 4. The dog 37 may be swung and clamped into friction locking engagement with the bottom of the slot 39 to lock applicator roller 4 against rotation.

The use and operation of the described implement will be readily understood. The pump 18 may be removed, in the manner described, so that the handle 1 may be filled, or partly filled, with face cream, not shown, through the filler opening 21, after which the pump 18 may be replaced. With the handle 1 grasped in one hand, the plunger rod 23 may be operated by a finger of the hand to cause face cream to be ejected from the handle 1 through the nozzle 35 against the cover 15 of the applicator roller 4 for application to the face by applying the applicator roller thereto. With the dog 37 swung and clamped into the previously described dogging position relative to the applicator roller 4, said roller will rotate on the face in limited degree and then be held against rotation so that the face cream may be applied first with a rolling action and then with a rubbing action. With the dog 37 swung into its releasing position, the face cream may be applied with a rolling action solely and with said dog swung into clamped friction locking engagement with the bottom of the slot 39 the face cream may be applied by rubbing action as will be clear. Of course, in any of the described uses of the applicator roller 4, the same effects a massaging action to work the cream into the face.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described my invention, what is claimed as new is:

1. A face cream applying implement comprising an elongated handle for grasping by a hand to manipulate the implement and being hollow and closed at its ends to contain face cream, an applicator roller, means to mount said roller opposite one end of the handle crosswise thereof, means to eject face cream from said handle onto said roller comprising a pump in said handle discharging into the other end of the handle and having a plunger rod provided with a finger button at said first named end of the handle operative for operating said pump by a finger of the hand grasping said handle, and dogging means to limit rotation of said roller to apply the face cream with a rolling action and a subsequent rubbing action.

2. A face cream applicator according to claim 1, wherein said roller and button are offset at opposite sides of the axis of the handle to obviate interference by said roller with the finger operating said button.

3. A face cream applicator according to claim 1, wherein said end is provided with a filler opening and said pump is provided with an end plug threaded into said opening to close the same and suspend the pump from said end of the handle.

4. A face cream applicator according to claim 1, wherein said first named means comprises a bracket arm on said handle, said last named means including a slot in said roller, and a pivoted dog on said arm for swinging into said slot to limit rotation of said roller by engagement with the ends of the slot.

5. A face cream applicator according to claim 1, wherein said first named means includes a bracket arm on said handle, and co-engaging devices on said bracket arm and one end of said roller disengageable to free said roller for unlimited rotation.

SOREN C. PETERSEN.

References Cited in the file of this patent

UNITED STATES PATENTS

| Number | Name | Date |
|--------|------|------|
| 1,947,042 | Glennan | Feb. 13, 1934 |
| 2,041,022 | Rassmussen | May 19, 1936 |

FOREIGN PATENTS

| Number | Country | Date |
|--------|---------|------|
| 127,959 | Switzerland | Oct. 1, 1928 |
| 684,451 | Germany | Nov. 29, 1939 |